(12) United States Patent
Eddie et al.

(10) Patent No.: US 7,266,820 B2
(45) Date of Patent: Sep. 4, 2007

(54) TRUNKED CUSTOMIZED CONNECTIVITY PROCESS FOR INSTALLING SOFTWARE ONTO AN INFORMATION HANDLING SYSTEM

(75) Inventors: Michelle A. Eddie, Austin, TX (US); Paul E. Krautz, Austin, TX (US); Preeti S. Samat, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 769 days.

(21) Appl. No.: 10/640,930

(22) Filed: Aug. 14, 2003

(65) Prior Publication Data

US 2005/0039179 A1 Feb. 17, 2005

(51) Int. Cl.
*G06F 9/445* (2006.01)

(52) U.S. Cl. ...................................... 717/176

(58) Field of Classification Search ........ 717/168–178; 709/217–222
See application file for complete search history.

(56) References Cited

U.S. PATENT DOCUMENTS

| | | | | |
|---|---|---|---|---|
| 5,963,743 A * | 10/1999 | Amberg et al. | ............. | 717/174 |
| 6,247,126 B1 | 6/2001 | Beelitz et al. | ................ | 713/1 |
| 6,272,533 B1 * | 8/2001 | Browne | ....................... | 709/213 |
| 6,279,155 B1 | 8/2001 | Amberg et al. | ............... | 717/11 |
| 6,279,156 B1 | 8/2001 | Amberg et al. | ............... | 717/11 |
| 6,285,967 B1 | 9/2001 | Rajan et al. | ................. | 702/188 |
| 6,477,486 B1 | 11/2002 | Ram et al. | ................... | 702/188 |
| 6,499,115 B1 | 12/2002 | Wiedeman et al. | ........... | 714/30 |
| 7,082,527 B2 * | 7/2006 | Zimmer et al. | ................ | 713/2 |
| 2004/0088700 A1 * | 5/2004 | Lee et al. | .................... | 717/178 |
| 2004/0210888 A1 * | 10/2004 | Bergen et al. | .............. | 717/168 |

OTHER PUBLICATIONS

Sun Microsystems, "Sun Trunking 1.2", 1999.*
S. Varadarajan, "Virtual Local Area Networks", Aug. 14, 1997.*

* cited by examiner

*Primary Examiner*—Meng-Al T. An
*Assistant Examiner*—Trenton J. Roche
(74) *Attorney, Agent, or Firm*—Baker Botts L.L.P.

(57) ABSTRACT

A system and method for installing software onto a modular information handling system includes a network, a modular information handling system and a trunking management module. The network includes a network access node and at least two VLANs. The modular information handling system has a chassis, at least two blades and an embedded switch in communication with the blades. The embedded switch has a plurality of uplink ports in communication with the network access node. The trunking management module is in communication with the embedded switch and aggregates the uplink ports of the embedded switch to form a trunked connection with the network access node.

20 Claims, 3 Drawing Sheets

TRUNKED CUSTOMIZED CONNECTIVITY PROCESS FOR INSTALLING SOFTWARE ONTO AN INFORMATION HANDLING SYSTEM

TECHNICAL FIELD

The present disclosure relates in general to the field of computer systems and more specifically to a trunked customized connectivity process for installing software onto an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business and institutional customers ordering information handling systems often require that information handling systems arrive with pre-installed software. Such software often allows the information handling systems to be compatible with a customer's existing computers, programs and network.

Modular information handling system such as a blade server with multiple blades present particular challenges in efficiently and reliably installing software requested by a customer. Multi-blade servers may perform a variety of tasks including storing data or programs, running administrative software and providing resources to workstations on a network. Multi-blade servers typically include midplanes for attaching multiple blades (sometimes referred to as "bricks"). Midplanes allow the multiple blades to be interconnected in a single chassis and to share a common power source. Each blade typically includes a processor and memory and may store data, process information, or perform particular tasks.

Blades in a modular information handling system communicate with other networked computing resources through an embedded switch associated with the midplane. The embedded switch is able to connect with a network and direct information packets between individual blades and different network addresses.

Existing methods for installing software onto modular information handling systems involved manually configuring the embedded switch for installation of software onto each blade. Such systems for installing software are inefficient as they require operator involvement during the installation of software onto each blade. Additionally, installation of software onto each modular server is often time-consuming because software is typically required to be installed on each blade, increasing the overall amount of software loaded onto a modular information handling system as compared with a non-modular information handling system.

SUMMARY

Therefore, a need has arisen for an improved system and method for installing software onto a modular information system.

A further need has arisen for a system and method for reducing operator involvement in installing software on a modular information handling system.

A further need exists for reducing the installation time for installing software onto a modular information handling system.

In accordance with teachings of the present disclosure, a system and method are described for installing software onto a modular information handling system that substantially reduces disadvantages and problems associated with previously developed systems and methods of installing software onto a modular information handling system. A system for installing software onto a modular information handling system includes a trunking management module able to configure a trunking connection between an embedded switch of a modular information handling system and a network access node of a network.

In one aspect, a system for installing software onto a modular information handling system includes a network and a modular information handling system. The network includes a network access node and at least two VLANs. The modular information handling system includes a chassis, at least two blades and an embedded switch with multiple uplink ports. A trunking management module connects with the embedded switch and aggregates the uplink ports of the embedded switch to form a trunked connection between the embedded switch and the network access node.

In a particular embodiment, the system includes a bar file database in communication with the trunking management module. The bar file database stores a bar file corresponding to a chassis and each blade associated with multiple information handling systems. The trunking management module may access the bar file database and identify each of the bar files associated with a selected modular information handling system.

In another aspect of the present disclosure, a method for installing software on a modular server includes providing a modular server and a network. The modular server includes a chassis, two or more blades and an embedded switch for communicating with the network that includes a network access node and multiple VLANs. The method further includes connecting a trunking management module with the modular information handling system and configuring the embedded switch to allow trunking between the embedded switch and the network access node. The method then includes installing software stored on one of the multiple VLANs onto the blades.

Important technical advantages of certain embodiments of the present disclosure include providing a trunking management module that facilitates the installation of software onto a modular information handling system by forming a trunk connection between an embedded switch of a modular information handling system and a network. The trunking management module also advantageously reduces operator involvement in the software installation process and further decreases the total time required to complete software installation by enabling a trunk connection between the embedded switch and the network.

All, some or none of these technical advantages may be present in various embodiments of the present disclosure and other technical advantages will be readily apparent to those skilled in the art from the following FIGURES, descriptions and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
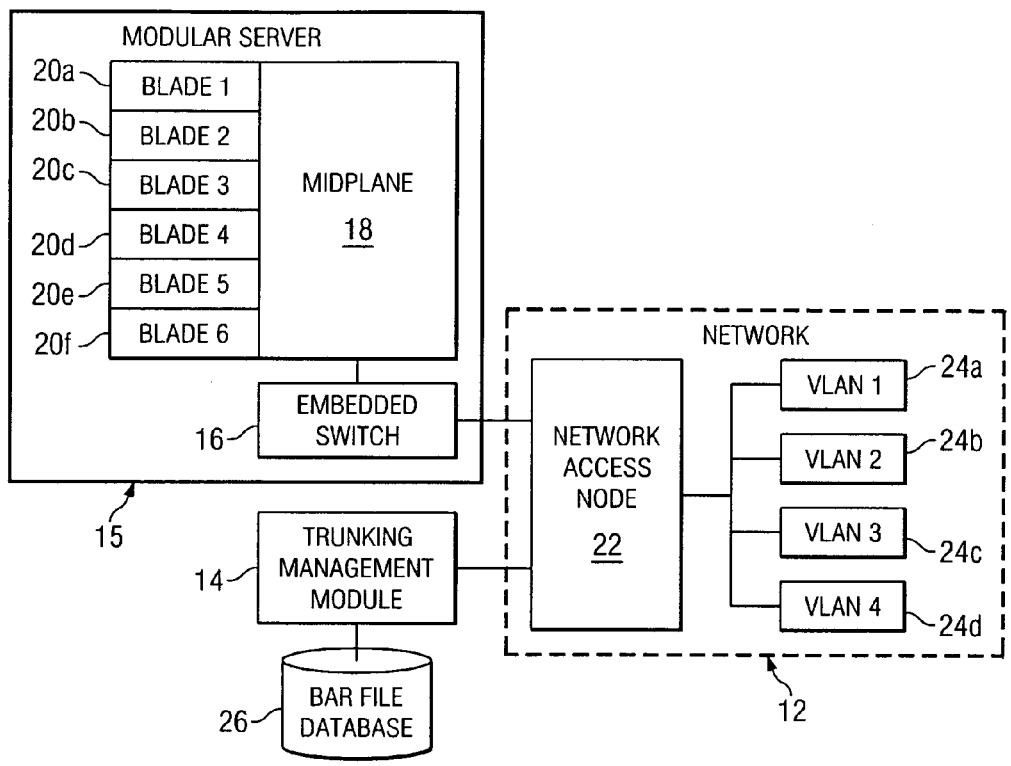
FIG. 1 illustrates a diagram of a modular information handling system associated with a network and a trunking management module according to teachings of the present disclosure.

FIG. 1 illustrates a block diagram of a modular information handling system, depicted generally at 10, associated with network 12 and trunking management module 14.

In the illustrated embodiment, modular server 10 includes embedded switch 16, midplane 18, blades 20a-20f and chassis 15. Embedded switch 16 enables communication between blades 20a-f and network 12. Embedded switch 16 receives incoming data packets and directs the data packets to reach the intended destination. For example, in a networking environment, embedded switch 16 may forward information packets from blade 20a to network access node 22.

Embedded switch 16 is preferably able to allow or deny read and write access from network 12. More specifically, embedded switch 16 may be configured to allow resources associated with network 12 to write configuration information onto switch 16. Alternatively, embedded switch 16 may be configured to allow read-only access to resources on network 12.

Embedded switch 16 is communicatively coupled with trunking management module 14. Trunking management module 14 is preferably able to configure embedded switch 16 to form a trunk-type connection with the outlet port of embedded switch 16 and network 12. Trunking management module 14 is also able to selectively control the read and write access of embedded switch 16.

Embedded switch 16 may also be referred to as an integrated switch. In one particular embodiment, embedded switch 16 is a Level 2 Ethernet LAN switching device.

Modular server 10 includes midplane 18. In the present embodiment, midplane 18 is a circuit board that interfaces with blades 20a-f and embedded switch 16. Midplane 18 may provide power and management resources to blades 20a-f. Midplane 18 also provides a communication link between each blade 20a-f and embedded switch 16.

Although midplane 18 includes six blades 20a-f, midplane 18 may include more or less than six blades 20a-f. System administrators may easily increase or decrease the processor density of midplane 18 by adding or removing blades 20a-f to midplane 18. Midplane 18 does not require all six blades 20a-f for proper functionality—one server blade 20a installed on midplane 18 is sufficient for proper functionality of both midplane 18 and system 10. In the present embodiment, midplane 18 includes at least two blades 20a and 20b.

Blades 20a-f are associated with midplane 18. In the present embodiment, each blade 20a-f is preferably an independent server able to act independently of the other blades 20a-f. Blades 20a-f are preferably a thin, ultra-dense, modular electronic circuit board containing one or more processors. Blades 20a-f may also include network functionality and storage capabilities such as memory. Blades 20a-f receive and send data through midplane 18 and embedded switch 16. Blades 20a-f preferably include pre-installed software operable to prompt trunking management module 14 to connect and disconnect blades 20a-f from software installation programs located on network 12.

During the final manufacturing stages of modular server 10, midplane 18, embedded switch 16 and blades 20a-f are fully assembled within chassis 15 of modular server 10. Chassis 15 is a housing that contains all the components of modular server 10. Chassis 15 and each blade 20a, 20b, 20c, 20d, 20e and 20f are preferably assigned a unique identifier such as a bar code. Each bar code is associated with a bar file 98 (See FIG. 2) that lists all components and software necessary to build modular server 10. Each bar file 98 also includes an order number associated with modular server 10 generated when an order for modular server 10 is initially placed. Accordingly, each bar file 98 associated with modular server 10 preferably shares a common order number. Bar file database 26 may be used to identify all of the bar files associated with modular server 10. For example, given the bar code of blade 20a, bar file database 26 may identify all bar files related to modular server 10, namely the bar file of chassis 15 and bar files of blades 20b-f. Through the use of bar file database 26, the bar code of chassis 15 is preferably used to access specifications including required software, concerning all blades 20a-f in chassis 15. Also included in bar file 98 is software download information for each blade 20a-f.

Although not expressly shown, modular server 10 may also include such components as a power source, connectors for management cards and a network interface card (NIC).

Modular server 10 is associated with network 12. Network 12 includes network access node 22 and VLANs 24a-d. Network access node 22 is an edge switch. Access node 22 provides access to network 12, including VLANs 24a, 24b, 24c and 24d.

Each VLAN 24 is a group of devices on one or more local area networks (LANs) that are configured using management software so that they can communicate as if they were attached to a single LAN line, when in fact they may be located on a number of different LAN segments. A virtual (or logical) LAN (VLAN) is a local area network with a definition that maps workstations on some other basis than geographic location (for example, by department, type of user, or primary application). The virtual LAN controller can change or add workstations and manage load-balancing and bandwidth allocation more easily than with a physical picture of the LAN. Network management software keeps track of relating the virtual picture of the local area network with the actual physical picture. The types of devices that may be present on a VLAN are workstations, switches, servers, routers and other such devices. Because VLANs 24 are based on logical instead of physical connections, they provide enhanced flexibility.

In the present embodiment, VLANs 24a, 24b, 24c and 24d each preferably acts as an independent VLAN. VLANs 24 may contain a variety of resources. In one embodiment, VLANs 24a-d may contain software applications for installation onto modular information handling system 10. In a particular embodiment, the software applications stored on one or more VLANs may be proprietary, customer specific software applications. In one embodiment, VLANs 24c and 24d may each be associated with a distinct customer and may have restricted access to securely stored software applications that are proprietary to each customer. Network access node 22 may have restricted access to VLANs 24c and 24d such that VLANs 24c and 24d may only be accessed to retrieve proprietary software if information handling system 10 has been ordered by the customer associated with VLAN 24c or VLAN 24d. In the present embodiment, VLANs 24a and 24b are factory-default VLANs that store software applications that are not proprietary to a specific customer (and may be generally accessed). Although the illustrated embodiment represents four VLANs (two of which are proprietary and two that are not), alternate embodiments may incorporate more or fewer VLANs which may or may not include VLANs designated to store proprietary software applications.

Trunking management module 14 is associated with embedded switch 16 and bar file database 26. In the present embodiment, trunking management module 14 is associated with embedded switch 16 through network access node 22. Trunking management module 14 selectively configures the settings of embedded switch 16 to enable a trunk connection between embedded switch 16 and node 22 to facilitate downloading software from VLANs 24a-d onto blades 20a-f. In some embodiments, trunking management module selectively manipulates the read and write access settings of embedded switch 16.

Trunking embedded switch 16 to network access node 22 creates a single, high speed and high data transfer line between embedded switch 16 and network access node 22. A trunk is a point to point link carrying several VLANs 24. The purpose of a trunk is to save ports when creating a link between two devices implementing VLANs, typically two switches. Trunking is enabled by configuring uplink ports 34 on embedded switch 16 to be tagged to the ports of network access node 22. Trunking has the advantage of allowing embedded switch 16 to connect blades 20a-f to different VLANs. In one embodiment, embedded switch 16 is pre-set to form a trunk connection with network access node 22 before trunking management module 14 operates.

The software download process starts when the software stored on one of blades 20a-f prompts trunking management module 14 to download specific software applications. For example, blade 20a may send a connect request to trunking management module 14. Based on the bar code of chassis 15 or one of blades 20a-f, trunking management module 14 retrieves installation information from bar file database 26. Software installation information includes the network address (such as the network address of one of VLANs 24a-d) that contains the required software, the internal connection between blade 20a to embedded switch 16, and the address of embedded switch 16. For example, from the bar code of blade 20a, trunking management module may access a listing of all the software to be loaded onto blades 20a-f and the network locations of the software applications that need to be loaded onto each blade 20. Next, trunking management module 14 sets embedded switch 16 to connect a selected blade, such as blade 20a to a selected VLAN, such as VLAN 24a to download software store thereon. When blade 20a has completed installing software from VLAN 24a, blade 20a sends a disconnect request to trunking management module 14. Trunking management module 14 may then send a command to embedded switch 16 to disconnect blade 20a from VLAN 24a. If blade 20a requests required software from VLAN 24b, trunking management module 14 retrieves the address of VLAN 24b and configures embedded switch 16 to connect blade 20a to VLAN 24b.

When blade 20a has completed all necessary software installation, blade 20a sends a disconnect instruction to trunking management module 14. Trunking management module 14 communicates with embedded switch 16 to disconnect blade 20a from network 12. In a preferred embodiment, trunking management module 14 may simultaneously manage software installation for multiple blades.

Once trunking management module 14 receives disconnection signals from all blades 20a-f on modular server 10 indicating completion of software installation, trunking management module 14 resets embedded switch 16 to its original configuration. Trunking management module 14 configures embedded switch 16 to disable the trunking functionality. Trunking management module 14 also preferably resets embedded switch 16 to allow only read-only access to embedded switch 16.

Bar file database 26 is associated with trunking management module 14. Bar file database 26 stores bar files 98. Bar files 98 preferably include complete product specifications including all components necessary to build each blade 20 of modular server 10 and all software requested to be installed on each blade 20. Bar file database 26 may be accessed by and may provide installation information thereto including trunking management module 14 and network addresses of VLANs 24a-d containing software to be installed on blades 20a-f. Trunking management module 14 then uses this network address information to set embedded switch 16 to connect to blades 20a-f to the specified VLANs 24a-d.

Figure 2:
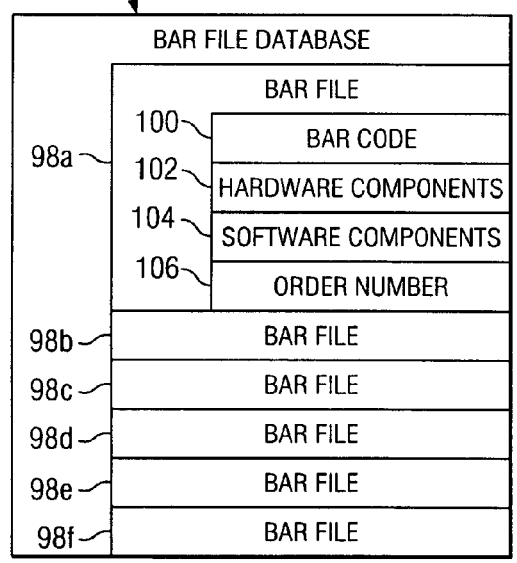
FIG. 2 illustrates a diagram of a bar file database.

FIG. 2 illustrates a diagram of a bar file database. In this embodiment, bar file database 26 stores bar files 98a-98f. Each bar file 98 contains product and order information regarding a component such as a blade 20 or chassis 15 of the modular server 10 being manufactured. For example, bar file 98a comprises information including bar code 100, hardware components 102, software components 104 and order number 106 associated with blade 20a. For instance, bar file 98a stores bar code 100, representing a unique identifier assigned to each bar file 98. Bar code 100 associates the blade 20 or chassis 15 to bar file 98a.

In a preferred embodiment, bar file 98 stores lists of all hardware components and software necessary to build modular server 10 using hardware components 102 and software components 104. Hardware components 102 lists all hardware components necessary to physically construct modular server 10. Software components 104 lists all software programs to be installed on modular server 10.

Bar file 98a may further store order number 106. Order number 106 is associated with modular server 10 and is generated when an order for modular server 10 is initially placed. For that reason, each bar file 98 associated with modular server 10 preferably shares a common order number.

Figure 3:
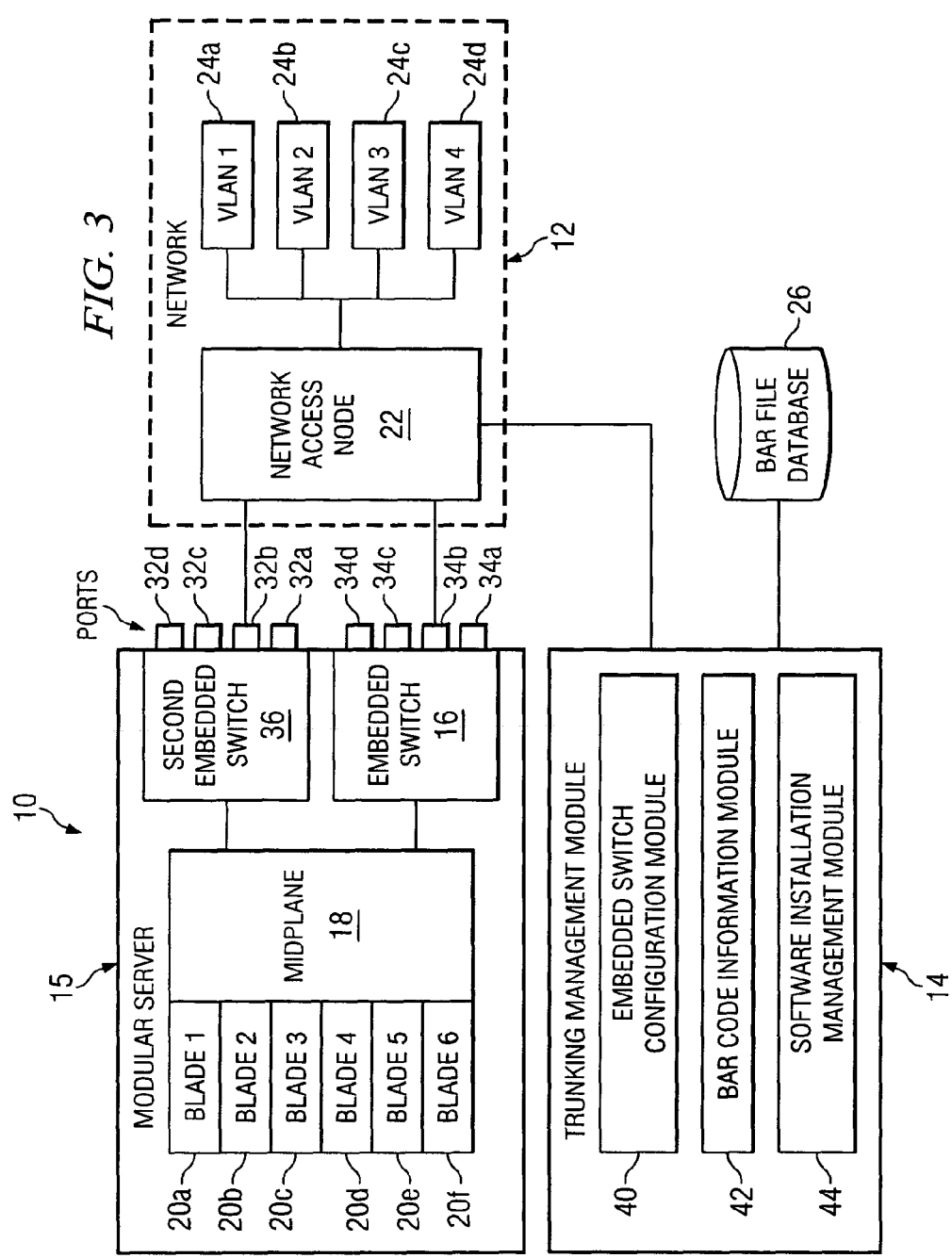
FIG. 3 illustrates a diagram of a particular embodiment of a modular information handling system associated with a network and a trunking management module.

FIG. 3 illustrates a block diagram of a modular information handling system, depicted as modular server 10, associated with network 12 and trunking management module 14.

In this embodiment, embedded switch 16 includes four uplink ports 34a-d. Uplink ports 34a-d are interfaces on embedded switch 16 that allow a physical connection with other devices, such as network access node 22. The external uplink ports 34a-d facilitate communication between blades 20a-f and network 12. Although the illustrated embodiment has four uplink ports, other embodiments allow for more or fewer uplink ports.

In this embodiment, modular server 10 has two embedded switches (16 and 36). Second embedded switch 36 is provided as a back up or fail over to embedded switch 16 and has the same functionalities including uplink ports 32a-d with similar characteristics as uplink ports 34a-d.

Trunking management module 14 includes embedded switch configuration module 40, bar code information module 42 and software installation management module 44. Embedded switch configuration module 40 configures embedded switch 16 to form a trunk connection with access node 22 as described above. Embedded switch configuration module 40 may also set embedded switch 16 to selectively enable or disable read and write access on embedded switch 16. Switch configuration module 40 may similarly configure second embedded switch 36.

Trunking management module 14 uses bar code information module 42 in order to retrieve software installation information involving blades 20a-f. Bar code information module 42 may receive a bar code value and retrieve software installation information from bar code database 26 for the modular server associated in the bar code. For example, bar code information module 42 may receive a bar code value from an electronic input of a scanned bar code of chassis 15 or one of the blades 20a-f. The bar code may also be received when a blade 20a-f prompts trunking management module 14 to install software. Given one bar code from one component of modular server 10, such as a bar code from chassis 15 or blade 20a-f, bar code information module 42 may identify all components of modular server 10 by interfacing with associated bar code database 26. Given a list of all the components, bar code information module 42 then may identify each software application to be installed on each blade 20a-f once again by interfacing with bar code database 26. Bar code database 26 preferably provides data such as network addresses of software applications to be installed on each blade 20a-f to bar code information module 42.

In one embodiment, bar code information module 42 obtains installation information from bar code database 26 including the required VLAN connection, the blade 20a-f to embedded switch 16 connection and the network addresses of embedded switch 16.

Trunking management module 14 uses software installation management module 44 to coordinate the installation of software from a plurality of VLANs 24a-d to blades 20a-f. Once configuration management module 40 has configured embedded switch 16 and/or embedded switch 36 to a read/write setting and enabled trunking functionality, software installation management module 44 coordinates the installation of software from VLANs 24a-d to blades 20a-f. Software installation management module 44 uses information from bar code information module 42 to identify the software to be installed on blades 20a-f and the VLANs 24a-d on which the software is stored. When blade 20a prompts the trunking management module 14 to download software, software installation management module 44 determines which software applications are to be installed on blade 20a and the locations of the software applications. Based on this information, software installation management module 44 then configures embedded switch 16 to connect blade 20a to the appropriate VLAN 24.

When blade 20a is finished installing all software needed from VLAN 24a, blade 20a prompts software installation management module 44. Software installation management module may then connect blade 20a to another VLAN such as VLAN 24b to download required software applications stored thereon. In this embodiment, software management module 40 allows software from two VLANs 24a and 24b to be installed onto blades of a modular server. In another embodiment, software installation management module 44 may simultaneously manage multiple software installation operations on modular server 10.

Each blade 20a-f prompts management module to indicate that the required software has been installed. Once all blades 20a-f have installed all required software, installation management module 44 instructs embedded switch 16 to reconfigure and reset embedded switch 16.

Trunking management module 14 interfaces with bar file database 26 and embedded switch 16. Trunking management module 14 may communicate with embedded switch 16 through a communication protocol such as Simple Network Management Protocol (SNMP).

Figure 4:
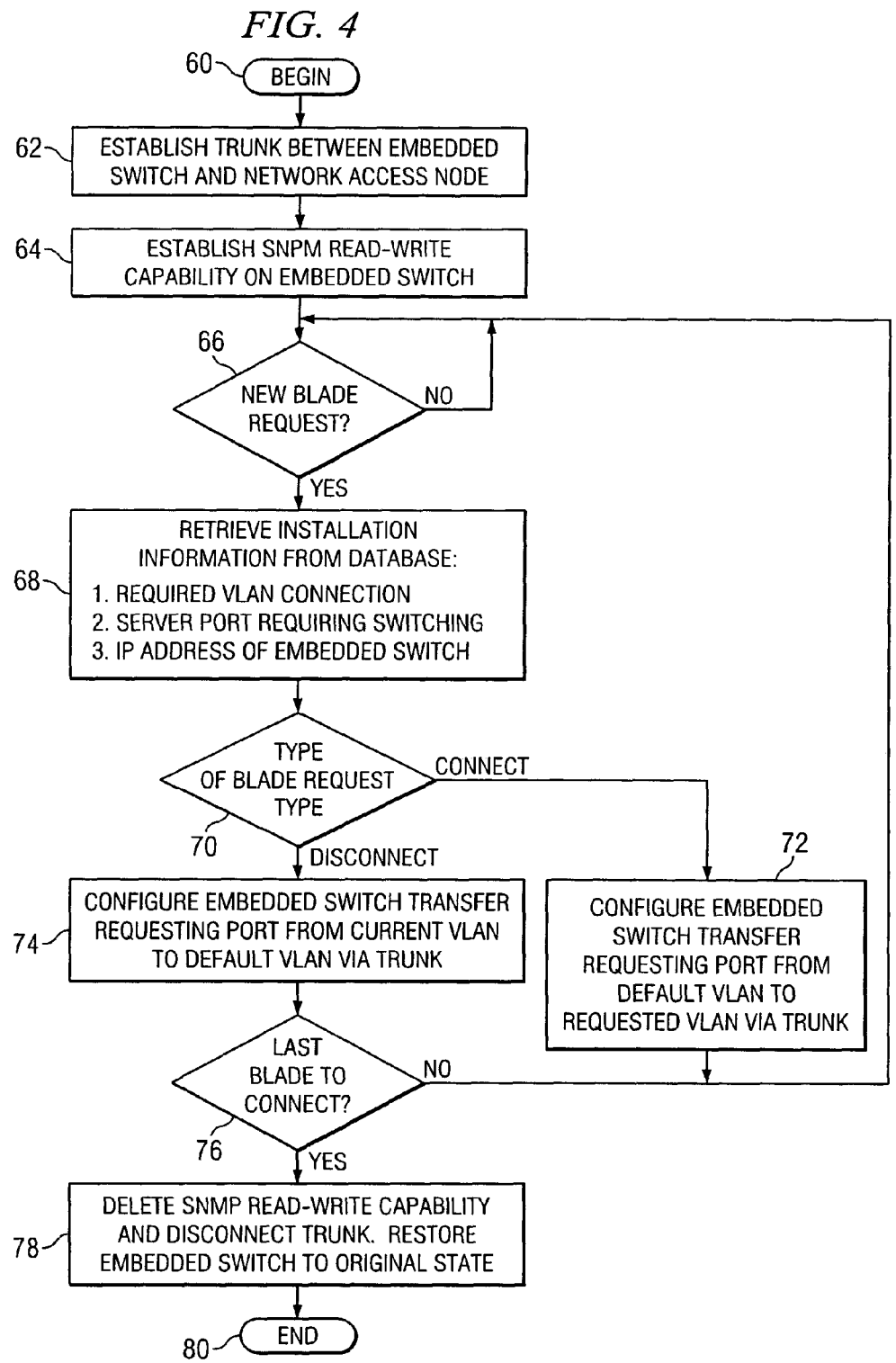
FIG. 4 illustrates a flow chart of a method for installing software on a modular server according to the present disclosure.

FIG. 4 illustrates a flow chart of a method for installing software on modular server 10 according to the present disclosure. The method begins at step 60. At step 62, embedded switch configuration module 40 establishes a trunk between embedded switch 16 and network access node 22. In one embodiment, embedded switch configuration module 40 aggregates at least one uplink port 34a-d of embedded switch 16 to form a trunk. Another embodiment may aggregate at least two uplink ports 34a-d to form a trunk.

At step 64 embedded switch configuration module 40 establishes Simple Network Management Protocol (SNMP) read and write capability on embedded switch 16. Embedded switch 16 on modular server 10 may be pre-set to provide only read access to server 10. In order to install software onto blades 20a-f, embedded switch 16 typically needs to be set to allow read and write access. In one embodiment, the embedded switch is a Level 2 Ethernet LAN switching device.

In another embodiment, embedded switch configuration module 40 establishes SNMP read and write capability on second embedded switch 36.

At step 66, trunking management module 14 waits for a new blade request. Blades 20*a-f* prompt trunking management module 14 when software installation is required. If no new blade request is received, the method repeats step 66 until a blade request is received.

If trunking management module 14 receives a new blade request, the method proceeds to step 68. At step 68 bar code information module 42 retrieves software installation data from bar code database 26. The information that bar code information module 42 retrieves from bar code database 26 includes the required VLAN connection (for locating the desired software application), the server port requiring switching and the IP address of embedded switch 16. In some instances, the desired software application may be proprietary software of a customer. In such instances, bar code database 26 informs trunking management module 14 of the network address of a proprietary server or VLAN designated for storing proprietary software of the customer.

Embedded switches 16 and 36 each contain multiple internal ports for connecting with blades 20*a-f*. The information regarding which internal port requires switching allows trunking management module 14 to connect embedded switch 16 to a selected blade 20.

Trunking management module 14 may receive an updated network address of embedded switch 16. In one embodiment, modular server 10 is located in a dynamic host configuration protocol (DHCP) environment. In this environment, the network address of embedded switch 16 may change while embedded switch 16 is connected to the network. Therefore, trunking management module 14 maintains an updated record of the network address of embedded switch 16.

Once trunking management module 14 retrieves information from step 68, the method proceeds to step 70 where trunking management module 14 identifies the type of blade request. The blade request type may include either a connect request or a disconnect request. If trunking management module 14 receives a connect request the method proceeds to step 72.

At step 72, software installation management module 44 configures embedded switch 16 to connect blade 20*a-f* to requested VLAN 24*c* via trunking. In one embodiment, blade 20*a-f* is already on a default network VLAN. In this embodiment, software installation management module 44 configures embedded switch 16 to transfer blade 20*a-f* from a default VLAN (such as 24*a*) to requested VLAN 24*c*.

Software installation management module 44 preferably uses the information from step 68 to set up network trunking between a selected blade 20 and a selected VLAN 24 for software installation. Software installation management module 44 uses the required VLAN connection to establish the required link between the selected VLAN 24 and the selected blade 20. The software installation management module 44 uses the server port information from step 68 to determine the desired connection between embedded switch 16 and the selected blade 20. Software installation management module 44 uses the IP address information from step 66 to send commands to embedded switch 16 to configure the connection between a selected blade and the selected VLAN 24 (utilizing a trunked connection). After step 72 is complete, the method loops back to step 66 and trunking management module 14 awaits a new blade request 66.

If at step 70, the type of blade request received is a disconnect request, then the blade is already connected with a VLAN and is finished downloading software. The method then proceeds to step 74. At step 74 software installation management module 44 commands embedded switch 16 to disconnect the link between a selected blade 20 and a selected VLAN 24. In one embodiment, software installation management module 44 reconfigures embedded switch 16 to transfer from the current VLAN to the default VLAN. In this embodiment the default VLAN is a factory VLAN. Software installation management module 44 uses the information received at step 68 to disconnect the selected blade 20 and VLAN 24.

In one embodiment, software installation management module 44 uses the default VLAN connection and server port information to develop a proper configuration that sets blades 20*a-f* back to the default VLAN. Software installation management module 44 then sends commands to embedded switch 16 to configure a connection properly between blade 20*a-f* and the default VLAN. After step 74 is complete, the method proceeds to step 76.

At step 76, trunking management module 14 determines whether any blades 20*a-f* are still connected to non-default VLANs 24 (such as VLAN 24*c*). If one or more blades is still connected to a non-default VLAN (such as VLAN 24*a*), then the method returns to step 66 to await a new blade request. If at step 76, all of blades 20*a-f* are connected to the default VLAN, the method proceeds to step 78.

At step 78, embedded switch configuration module 40 disables the SNMP read-write capability and disconnects the trunk so as to restore embedded switch 16 back to its original state. Embedded switch configuration module 40 sends SNMP commands to embedded switch 16 to disable the trunk connection with node 22. Next, embedded switch configuration module 40 configures embedded switch 16 to have read-only access. After embedded switch configuration module 40 has set embedded switch 16 back to its original state, the method proceeds to step 80 where the method ends.

It should be noted that the hardware and software components depicted in the example embodiment represent functional elements that are reasonably self-contained so that each can be designed, constructed, or updated substantially independently of the others. In other embodiments, however, it should be understood that the components may be implemented as hardware, software, or combinations of hardware and software for providing the functionality described and illustrated herein.

In addition, one of ordinary skill will appreciate that other embodiments can be deployed with many variations in the number and type of devices in the system, the communication protocols, the system topology, the distribution of various software and data components among the hardware systems in the network, and myriad other details without departing from the present invention.

Although the disclosed embodiments have been described in detail, it should be understood that various changes, substitutions and alterations can be made to the embodiments without departing from their spirit and scope.

What is claimed is:

1. A method for installing software on a modular server comprising:

providing a modular server having a chassis, the chassis having at least two blades installed therein and an embedded switch operable to selectively communicate within a network;

providing a network for accessing software to be installed onto the at least two blades, the network comprising a network access node and a plurality of VLANs;

connecting a trunking management module with the modular server; the trunking management module operable to the embedded switchin the modular server to enable and disable trunking between the embedded switch and the network access node;

receiving at the trunking management module a connect request from one of the blades;

in response to receiving the connect request, configuring the embedded switch to allow trunking between the embedded switch and the network access node;

installing software from at least one of the plurality of VLANs onto the at least two blades using the trunking between the embedded switch and network access node; and configuring the embedded switch to disable trunking after the software is installed.

2. The method of claim 1, further comprising:

providing a bar file for each blade and the chassis, the bar file operable to store software installation information for each blade;

providing a bar file database associated with the trunking management module; the bar file database operable to store bar a plurality of bar files;

storing the bar file associated with each blade and the chassis in the bar file database; and retrieving the bar file from the bar file database.

3. The method of claim 2 wherein retrieving the bar file further includes:

determining a first bar file associated with a first blade of the modular server; and identifying bar files of components associated with the first blade and stored in the bar file database.

4. The method of claim 1, wherein configuring the embedded switch further comprises;

configuring the embedded switch to have read and write capabilities; and configuring the embedded switch to have read only capability following completion of the software installation step for all the associated blades.

5. The method of claim 1 wherein configuring the embedded switch to allow trunking further comprises configuring a second embedded switch associated with the modular server to facilitate trunking in cooperation with the embedded switch.

6. The method of claim 1 wherein the embedded switch comprises a Level 2 Ethernet LAN switching device.

7. A system for installing software onto a modular information handling system comprising:

a network having a network access node and at least two VLANs associated therewith;

a modular information handling system having a chassis, at least two blades installed therein and;

an embedded switch in communication with the at least two blades;

the embedded switch having a plurality of uplink ports in communication with the network access node; and a trunking management module in communication with the embedded switch, the trunking management module operable to:

receive a connect request from one of the blades;

in response to the connect request, configure the embedded switch to allow trunking between the embedded switch and the network access node;

aggregate the uplink post of the embedded switch to form a trunked connection with the network access node for installing software from at least one of the plurality of VLANs onto the blade; and configure the embedded switch to disable trunking after the software is installed.

8. The system of claim 7 further comprising a bar file database, the bar file database storing a bar file corresponding to each chassis and each blade; and the trunking management module operable to access the bar file database.

9. The system of claim 7, the trunking management module further operable to:

identify each bar file associated with the modular information handling system given one bar file of one component of the modular information handling system; and identify each software application to be installed onto each blade.

10. The system of claim 7 wherein at least one of the VLANs comprises a restricted access VLAN for storing proprietary, customer specific software.

11. The system of claim 7 wherein the embedded switch comprises a Level 2 Ethernet LAN switching device.

12. The system of claim 7 wherein the embedded switch comprises a plurality of uplink ports.

13. The system of claim 7 wherein the trunking module aggregates at least one uplink port on the embedded switch to form a trunked connection with the network access node.

14. The system of claim 7 wherein the modular information handling system further comprises a second embedded switch having a plurality of uplink ports and the trunking management module operable to aggregate at least two uplink ports of the second embedded switch with the aggregated uplink ports of the embedded switch.

15. A trunking management module store in tangible computer storage media and executable by a processor for managing the installation of software onto blades of a modular server, the trunking management module comprising:

a plurality of ports associated with the trunking management module, the ports operable to interface with an uplink port of an embedded switch of a modular server and a bar code database;

an embedded switch configuration module operable to:

manipulate the settings of the embedded switch to enable trunking with an associated network in order to install software stored in the associated network onto at least two blades associated with the modular server; and manipulate the setting of the embedded switch to disable trunking with the associated network after the software is installed; and a software installation management module operable to manage the installing of software stored in the associated network to the blades associated with the modular server.

16. The trunking management module of claim 15 further comprising the embedded switch configuration module operable to:

configure the embedded switch to enable read operations and a write operations; and configure the embedded switch to enable only read operations.

17. The trunking management module of claim 15 further comprising the bar code information module operable to:

identify each blade associated with the modular server based upon a bar code of a blade associated with the modular server; and identify and retrieve software installation information for each blade associated with the modular server.

18. The trunking management module of claim 15, the software installation management module further operable to aggregate a plurality of uplink ports associated with a second embedded switch with the plurality of uplink ports associated with an embedded switch.

19. The trunking management module of claim 15, wherein the software installation module operable to simultaneously manage at least two software installation operations.

20. The trunking management module of claim 15, further comprising the software installation module operable to enable software from at least two associated VLANs to be installed onto selected blades of the modular server.

* * * * *